US012570056B2

(12) United States Patent
Gillessen et al.

(10) Patent No.: US 12,570,056 B2
(45) Date of Patent: Mar. 10, 2026

(54) METHOD FOR MANUFACTURING A COMPLEX COMPOSITE PART USING A SINGLE-USE INFLATABLE MANDREL

(71) Applicant: Airbus Operations GmbH, Hamburg (DE)

(72) Inventors: Alexander Gillessen, Hamburg (DE); Tobias Meyer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 71 days.

(21) Appl. No.: 18/350,949

(22) Filed: Jul. 12, 2023

(65) Prior Publication Data

US 2024/0017505 A1     Jan. 18, 2024

(30) Foreign Application Priority Data

Jul. 15, 2022    (EP) ...................................... 22185284

(51) Int. Cl.
B29C 33/50          (2006.01)
B29C 33/48          (2006.01)
                    (Continued)

(52) U.S. Cl.
CPC ............ B29C 70/48 (2013.01); B29C 33/485 (2013.01); B29C 33/52 (2013.01); B64F 5/10 (2017.01);
                    (Continued)

(58) Field of Classification Search
CPC ..... B29C 64/188; B29C 43/10; B29C 70/462; B29C 33/50; B29C 33/485
See application file for complete search history.

(56) References Cited

U.S. PATENT DOCUMENTS 4,000,240 A * 12/1976 Green .................. B29D 29/085
                                                                    264/231
4,126,659 A * 11/1978 Blad ..................... B29C 53/845
                                                                    156/80
(Continued)

FOREIGN PATENT DOCUMENTS

DE          4402984 C2     4/1996
DE     102007027755 A1    12/2008
(Continued)

OTHER PUBLICATIONS

Kim, G., E. Barocio, R.B. Pipes, R. Sterkenburg, 3D printed thermoplastic polyurethane bladder for manufacturing of fiber reinforced composites, Additive Manufacturing, vol. 29 (2019), 10 pages. (Year: 2019).*

(Continued)

*Primary Examiner* — Matthew J Daniels
(74) *Attorney, Agent, or Firm* — Greer, Burns & Crain, Ltd.

(57)          ABSTRACT

A mandrel is 3D-printed from a thermoplastic material that exhibits a glass transition. The mandrel has a mandrel wall made from the thermoplastic material and a cavity. The mandrel is coated with an elastomer coat and a fiber material is arranged on the elastomer coat. A composite part is formed from the fiber material by inserting the mandrel into a mold, pressurizing the mandrel, and heating the mold to a mold temperature greater than the glass transition temperature without melting the mandrel wall. The mandrel expands and presses the fiber material against the mold. The composite part is cured by increasing the mold temperature and simultaneously melting the mandrel wall.

14 Claims, 4 Drawing Sheets

(51) Int. Cl.

| | |
|---|---|
| B29C 33/52 | (2006.01) |
| B29C 70/48 | (2006.01) |
| B64F 5/10 | (2017.01) |
| *B29L 31/30* | (2006.01) |
| *B33Y 80/00* | (2015.01) |

(52) U.S. Cl.

CPC ....... *B29L 2031/3076* (2013.01); *B33Y 80/00* (2014.12)

(56) References Cited

U.S. PATENT DOCUMENTS

| | | | | |
|---|---|---|---|---|
| 4,684,423 | A * | 8/1987 | Brooks | B29C 53/824 156/196 |
| 5,259,901 | A * | 11/1993 | Davis | B29C 70/446 156/154 |
| 5,817,203 | A * | 10/1998 | Moser | B65H 54/64 156/169 |
| 8,430,984 | B2 * | 4/2013 | Lee | B29C 33/505 156/169 |
| 8,753,091 | B1 * | 6/2014 | Braley | F03D 13/10 416/226 |
| 9,138,919 | B2 * | 9/2015 | Morris | B29C 70/446 |
| 9,757,876 | B2 | 9/2017 | Broeska et al. | |
| 10,272,596 | B2 * | 4/2019 | Register | B29C 33/485 |
| 11,292,213 | B2 | 4/2022 | Von Koenigsegg | |
| 2011/0278769 | A1 * | 11/2011 | Ehbing | B29C 33/68 425/89 |
| 2018/0111315 | A1 * | 4/2018 | Achten | B29C 64/141 |
| 2020/0122363 | A1 * | 4/2020 | Heath, III | B29C 33/405 |
| 2021/0008765 | A1 | 1/2021 | Connell | |
| 2021/0122087 | A1 | 4/2021 | Cooper | |
| 2022/0250341 | A1 * | 8/2022 | Bergmann | B29C 70/446 |

FOREIGN PATENT DOCUMENTS

| | | |
|---|---|---|
| EP | 3740364 B1 | 3/2023 |
| WO | 2021076777 A1 | 4/2021 |

OTHER PUBLICATIONS

Partial European Search Report for corresponding European Patent Application No. 22185284 dated Jan. 3, 2023; priority document.
Extended European Search Report for corresponding European Patent Application No. 22185284 dated Apr. 14, 2023; priority document.

* cited by examiner

METHOD FOR MANUFACTURING A COMPLEX COMPOSITE PART USING A SINGLE-USE INFLATABLE MANDREL

CROSS-REFERENCES TO RELATED APPLICATIONS

This application claims the benefit of the European patent application No. 22185284.1 filed on Jul. 15, 2022, the entire disclosures of which are incorporated herein by way of reference.

FIELD OF THE INVENTION

The invention relates a method of manufacturing a composite part, preferably for an aircraft. The invention further relates to a single-use mandrel and a method for manufacturing the same.

BACKGROUND OF THE INVENTION

EP 3 740 364 A1 discloses manufacture of lightweight and strong components using self-skinning foam material compositions. One or more mandrels may be inserted into a molding tool, and a self-skinning foam material composition may be injected into the molding tool. After closing the molding tool, the self-skinning foam material composition may expand and cure to form a component, and one or more skins may be formed on exterior and/or interior surfaces of the component.

US 2021/0 008 765 A1 discloses a mandrel mold tool for forming a mandrel that includes a plurality of mandrel mold tool members that are configured for fastening together to form a mandrel mold tool having an internal compartment.

U.S. Pat. No. 9,757,876 B2 discloses a method for making an article from a curable material, such as pliable fiber-reinforced polymer. The method includes printing a dissolvable, three dimensional substructure using a substructure material; applying the curable material to the substructure; curing the curable material while it is on the substructure; and dissolving the substructure using a dissolving agent. Using a 3D printer to print the substructure allows for faster and more economical manufacture of composite articles, such as prototype parts, relative to conventional methods that utilize CNC machines.

WO 2021/076 777 A1 discloses a hybrid mandrel that can be used for filament winding a composite pressure vessel, tank, or tube. The hybrid mandrel is formed of at least two components, an inner component and an outer component. The inner component may be a foam material that can be extracted from the formed tank. This portion is generally not reusable and is removed via a chemical solvent or via raised temperature, causing the component to shrink or otherwise reduce to a size that allows it to be removed from an opening of the tank. The outer component is generally formed of a different material and may either be reusable or non-reusable.

US 2021/0 122 087 A1 discloses an additively manufactured mandrel, including a plurality of separable segments arranged to form a main body having a first end and a second end. Each separable segment is connected to adjacent segments. A first plug connected to the first end, and a second plug connected to the second end of the main body are configured to support the main body during a composite curing process.

The manufacturing of CFRP parts with complex inner shapes involves a large effort and is typically labor and time intensive. Currently this is done by using an elastic/thermoplastic tube-like core, on which the carbon fibers are placed by hand. Once the core is coated with carbon fiber patches, a split-mold is closed around the workpiece. It is then bagged for vacuum, while ensuring that atmospheric pressure can be applied to the inside of the mold core. This is typically done by placing a tube-like plastic film through the hollow core and seal its edges against the edges of the bag that surrounds the mold. Due to the way the core piece is manufactured, large undercuts and complex manifold shapes are usually very hard to realize, some shapes may be impossible.

SUMMARY OF THE INVENTION

It is an object of the invention to improve the manufacturing of composite parts having complex interior shapes.

The invention provides a method for manufacturing a composite part, preferably for an aircraft, the method comprising:

a) preparing a mandrel, preferably by additive manufacturing, from a thermoplastic material that exhibits a glass transition at a glass transition temperature, the mandrel having a mandrel wall that defines a cavity;

b) arranging a fiber material on an outer mandrel surface and inserting the mandrel into a mold;

c) forming a composite part from the fiber material, wherein the forming includes pressurizing the cavity and heating the mandrel to a temperature greater than the glass transition temperature without melting the mandrel wall;

d) curing the composite part by heating the composite part to a curing temperature;

e) removing the mandrel by melting the mandrel wall and removing the molten portion of the mandrel from the composite part.

Preferably, in step a) the thermoplastic material is chosen to be soluble in a predetermined solvent.

Preferably, step a) includes coating the mandrel wall with an elastomer coat and the elastomer coat forms the outer surface. Preferably, step a) includes coating the mandrel wall with a fiber material that includes fibers before coating with the elastomer coat, so as to embed the fibers in the elastomer coat. Preferably, the mandrel wall is dip-coated. Preferably the elastomer coat includes a silicone material and/or a latex material.

Preferably, step c) includes the mandrel wall expanding thereby pressing the elastomer coat towards the mold.

Preferably, in step d) the composite part is cured by increasing the mold temperature to a curing temperature that is greater than the glass transition temperature and simultaneously melting the mandrel wall.

Preferably, step e) includes removing the elastomer coat from the composite part, preferably by pulling the elastomer coat and/or using a vacuum.

Preferably, in step d) the elastomer coat keeps getting pressed towards the mold.

Preferably, in step b) the mold is a split-mold and the split-mold is closed after inserting the mandrel. Preferably, in step b) the mold is put in a vacuum bag.

Preferably, in step b) the fiber material is chosen from a group of fiber materials consisting of non-woven material, felt material, knitted material, woven material, and prepreg material.

Preferably, in step c) the forming of the composite part comprises infusing the fiber material with thermo-curable resin.

Preferably, in step e) the removing of the molten portion of the mandrel includes pouring and/or washing with a solvent.

The invention provides a single-use additively manufactured mandrel for use in manufacturing of a composite part, the mandrel comprising a mandrel wall including a thermoplastic material that exhibits a glass transition at a glass transition temperature, wherein the mandrel wall defines a cavity; and an elastomeric coat arranged on at least an outside surface of the mandrel wall.

Preferably, a pulling member is attached to the elastomer coat.

The invention provides a method for manufacturing a single-use mandrel for use in a manufacturing method of a composite part, the method comprising:

a) additively manufacturing a mandrel wall from a thermoplastic material that exhibits a glass transition at a glass transition temperature, wherein the mandrel wall defines a cavity;

b) coating at least an outside surface of the mandrel wall with an elastomer coat.

Preferably, the mandrel wall is dip-coated. Preferably, a pulling member is attached to the elastomer coat.

The ideas presented can be applied for the manufacturing of composite parts, such as carbon fiber reinforced plastic (CFRP) parts, with complex inner shapes, e.g. manifolds or complex pipes. The parts geometric complexity is typically limited by the complexity of its outer mold. It could be used for manufacturing complex pipe connectors for distributing/collecting fluids and gases or complex shaped tanks (e.g., lightweight gas manifold for gas supply of H2 fuel cell systems.)

One idea aims for simplifying the process of vacuum bagging by eliminating the need for bags within the inflatable core structure while increasing the achievable part complexity including manifold or tank geometries.

Another idea involves a (possibly complex) thermoplastic shape which may be fabricated by additive manufacturing. The shape is preferably mostly hollow but has a closed surface such that it can be pressurized. The thermoplastic material has a comparably low glass transition and/or melting temperature (e.g., PLA). After the thermoplastic shape is created, it is preferably dip-coated in a silicone-like or latex-like substance, which forms a thin elastomeric outer shell around the thermoplastic shape.

Once the coating is cured, fibers (preferably prepreg) can be placed around the shape. Once all fiber patches are placed, the part can be enclosed by a suitable mold (e.g., a split-mold). The mold is configured to allow a fluid connector to connect into the hollow space inside the mandrel within the split-mold via a fluid hose. The assembled mold can be placed in a vacuum bag. The space inside the mandrel is pressurized. Once the mandrel is heated to glass transition temperature (e.g., by hot pressurized air inside the mandrel or via the mold) the mandrel will start to expand within the mold. The expanding mandrel is pushing the fibers against the mold surfaces. Airtightness is achieved by the elastic coating on the mandrels surface. This also enables this kind of mandrel to be used in a high temperature curing environment (e.g., 180° C. in a resin transfer molding process). In a high temperature environment, the thermoplastic component of the mandrel will be destroyed (melted) while the elastomer hull still enables airtightness and applies pressure to the surrounding fibers against the mold. This is based on recognition that the structural integrity of the (entire) mandrel is usually only necessary during initial fiber placement and handling.

Once the part is cured, the mold can be removed. The CFRP part can then be heated in an oven which softens or melts the thermoplastic structure of the mandrel (if not already molten during the curing process). It can be removed by pulling or pouring the thermoplastic through an opening in the part, which can be present or may need to be created in an unimportant area (e.g., trim area). Unimportant depends on the actual part being manufactured, but generally relates to an area that can be opened without compromising the functionality of the final part.

Finally, the thin elastomer film can be removed through the same opening by pulling it out. This process allows to remove the mandrel from complex inner shapes, as well as undercuts to some extent. Alternatively, the thermoplastic core of the mandrel can be made from a water soluble material (e.g., PVA), so the material could be removed by rinsing/washing with water.

It is noted that with the ideas described herein, internal areas can be (easily) pressurized with more than one atmosphere of pressure, as is the typical limit in the prior art methods. The mandrel may be single-use, however, the advantages provided with this idea outweigh the extra effort for making the mandrel.

As an optional improvement/addition of/to the basic idea, the elastomer coating of the mandrel can be combined with/attached to fibers or fiber patches, which can help removing the elastomer from the inside of a manufactured part, by manually pulling out the fibers and with them the elastomer coating. The fibers are preferably present in/on the thermoplastic core before dip coating and can be connected to the elastomeric hull during the curing of the coating.

With these measures, typically difficult features, such as undercuts on inner contours, shapes of higher complexity, complex manifold/multi-tube geometries can be manufactured with more ease. For some features the ideas described herein are the only possible way compared to the previously known methods.

Furthermore, the placement of vacuum bags inside the mandrels can be avoided, i.e. the inner vacuum bag is replaced by the elastomer coat. Additionally, the time for mold preparation may be decreased. Also, no tools and/or work required for reshaping of the mandrel after use is necessary.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Figure 1:
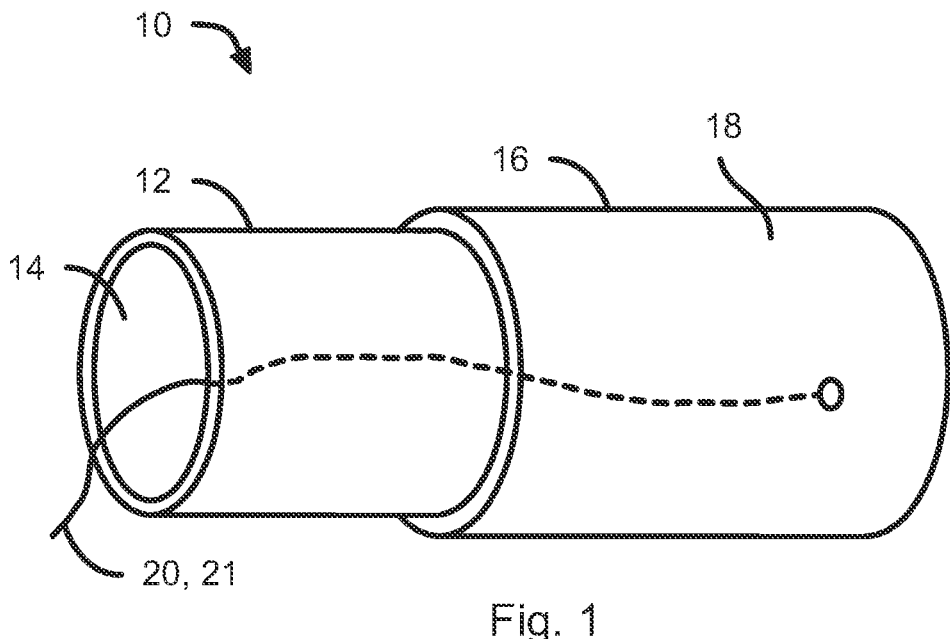
FIG. 1 to FIG. 7 depict an embodiment of a manufacturing method according to the invention.

Referring to FIG. 1, an exemplary mandrel 10 is depicted. The mandrel 10 comprises a mandrel wall 12. The mandrel wall 12 is made by additive manufacturing, e.g., 3D-printing, from a thermoplastic material. The thermoplastic material has a glass transition at a glass transition temperature Tg and melts at a melting temperature Tm. The thermoplastic material may be polylactic acid (PLA), for example. PLA has a glass transition temperature Tg of about 45° C. to 65° C. and a typical melting temperature Tm of about 150° C. to 160° C. Due to additive manufacturing, the mandrel wall 12 can be formed into shapes that include undercuts or a rather complex pipe system, for example.

The mandrel 10 includes a cavity 14 that is at least partially defined by the mandrel wall 12. Typically, the cavity 14 is configured such that the entire mandrel 10 may be pressurized. In other words, the mandrel wall 12 defines at least one fluidly continuous cavity 14.

The mandrel wall 12 may be covered with a fiber material. Subsequently, the mandrel wall 12 is preferably coated with an elastomer coat 16. The mandrel wall 12 may be coated by dipping into the coating material. Preferably, the cavity 14 is closed off so that only the outside of the mandrel wall 12 is coated.

The elastomer coat 16 may include a silicone-material and/or a latex-material. The elastomer coat 16 forms an outer mandrel surface 18. In case a fiber material was used, the elastomer coat 16 is coated such that the fibers of the fiber material are embedded in the elastomer coat 16.

Optionally, the mandrel 10 may include a pulling device 20 that is attached to the elastomer coat 16. The pulling device 20 may include a thread 21 that preferably extends from the elastomer coat 16 through the mandrel wall 12 and the cavity 14 towards an open end of the mandrel 10.

Figure 2:
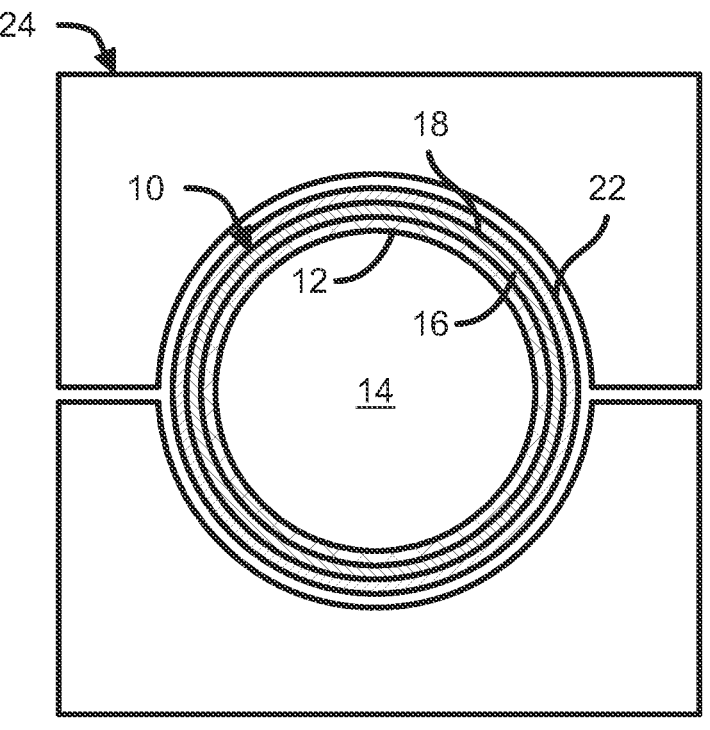

Referring to FIG. 2, a fiber material 22 is arranged on the outside surface 18. The fiber material 22 may be carbon fiber prepreg material, for example. Other fiber materials are also possible. The mandrel 10 and with it the fiber material 22 are inserted into a mold 24. The mold 24 may be a split-mold. As shown in the figure, the mandrel 10 is undersize compared to the mold interior that defines the final shape of composite part to be made.

Figure 3:
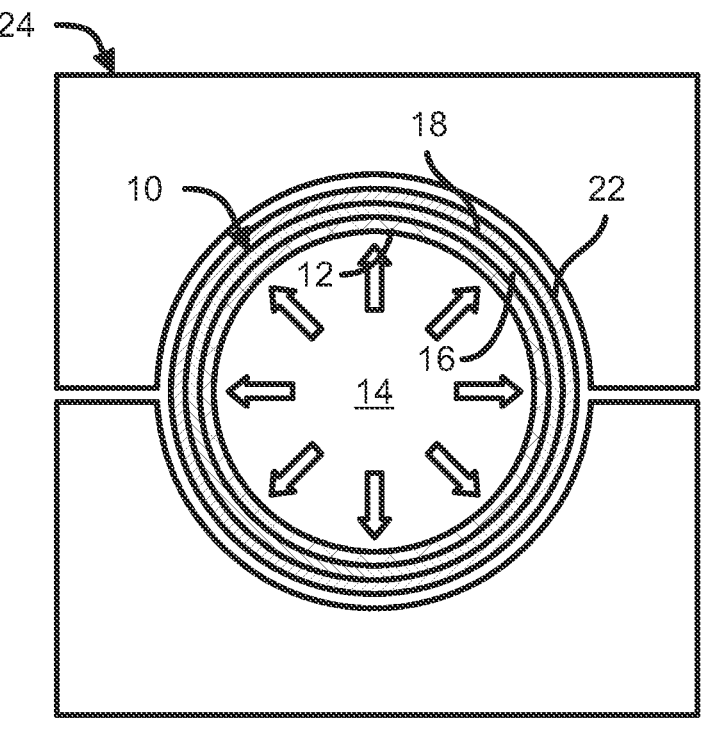

Referring to FIG. 3, the mold 24 is heated and mandrel 10 is pressurized. The mold 24 is heated in a manner known per se and the mandrel 10 may be heated via the mold 24 or by heated fluid that is also used to pressurize the mandrel 10. The temperature T is such that it is below the glass transition temperature Tg and the melting temperature Tm.

Figure 4:
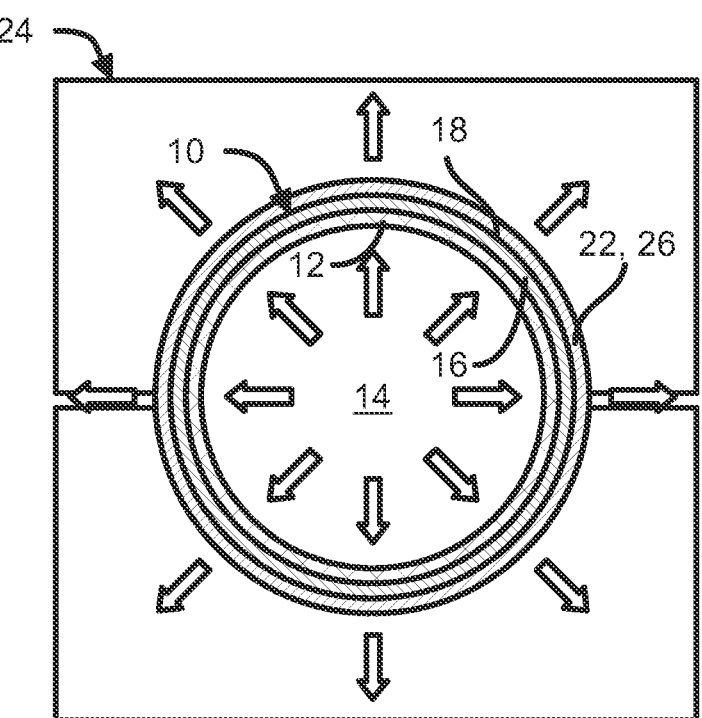

Referring to FIG. 4, the temperature T is increased to be above the glass transition temperature Tg but below the melting temperature Tm. As a result, the mandrel wall 12 is able to expand and press the fiber material 22 against the mold 24 via the elastomer coat 16, thereby forming a composite part 26.

Depending on the process, it is also possible to infuse the fiber material 22 with resin at this point, e.g., in case of resin transfer molding. The pressure for injecting the resin is chosen so as not to collapse the mandrel 10. Or put differently, the pressure within the mandrel 10 can be chosen so as to withstand the injection pressure of the resin and still press the composite part 26 against the mold 24.

Figure 5:
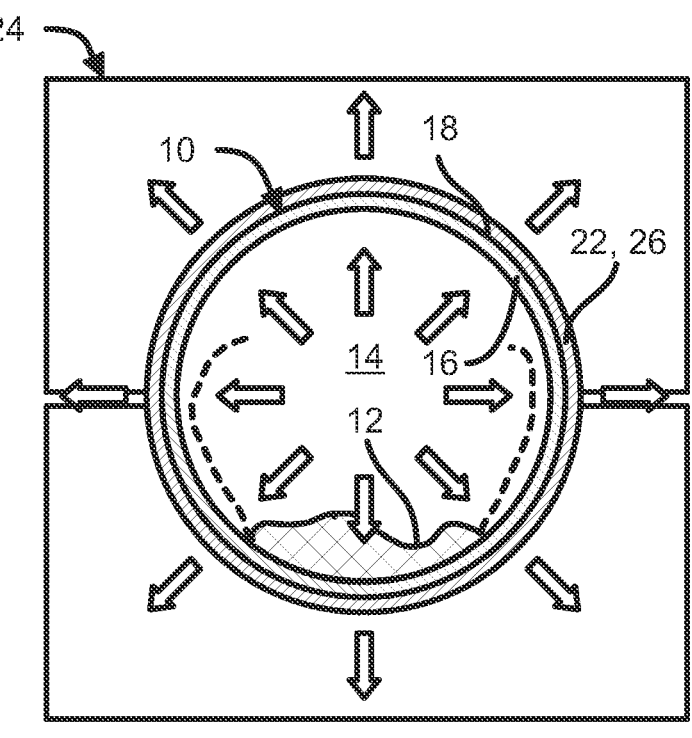

Referring to FIG. 5, the temperature T is increased above the melting temperature Tm of the mandrel wall 12, while still keeping the cavity 14 pressurized. The temperature T is preferably chosen so as to cure the resin in the fiber material 22, thereby consolidating the composite part 26 into its final shape.

Due to the temperature T, the mandrel wall 12 melts and collects at low points within the cavity 14. The pressure now directly acts on the elastomer coat 16 that keeps pressing the fiber material 22 against the mold 24.

Figure 6:
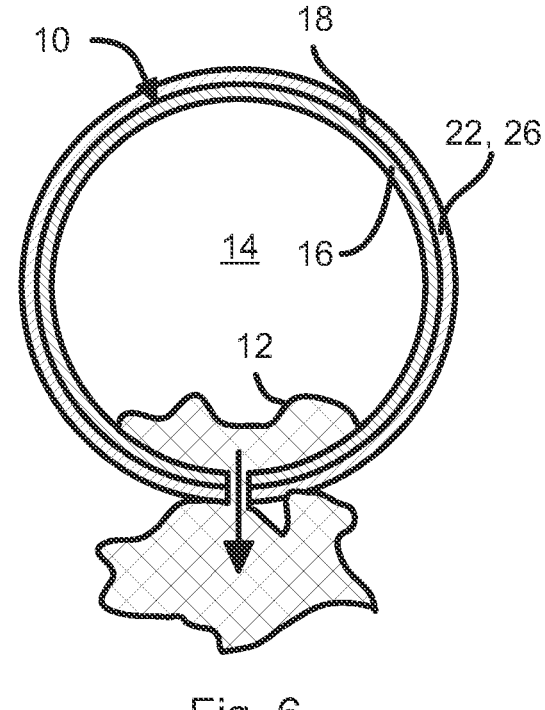

Referring to FIG. 6, the composite part 26 is removed from the mold 24. If necessary, an opening can be cut into the composite part 26 in an unimportant area. The still molten mandrel wall 12 may be poured out of the cavity 14. It is also possible to use an appropriate solvent to wash out the remainder of the former mandrel wall 12. For PLA one can use dichloromethane (DCM), trichloromethane (TCM, chloroform), or tetrahydrofuran (THF, oxolane). Alternatively, the mandrel wall 12 may be made from polyvinyl acetate (PVA), which can be dissolved with water.

Figure 7:
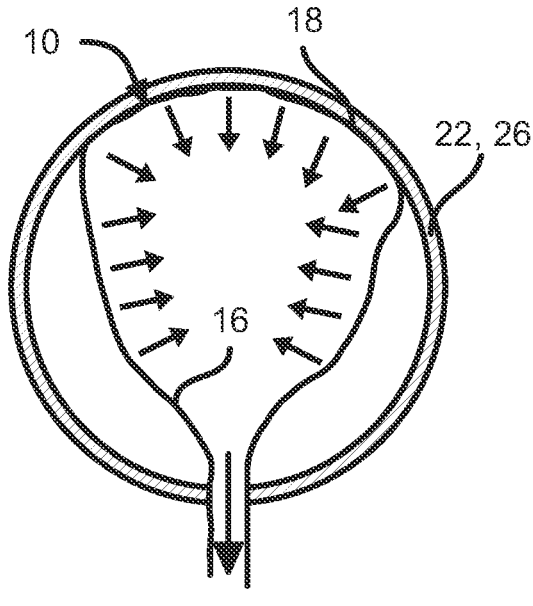

Referring to FIG. 7, the remaining elastomer coating 16 can be removed using the pulling device 20 or by applying a vacuum and basically sucking the elastomer coating 16 out of the cavity 14, preferably through the same opening that was used to remove the mandrel wall 12.

The result of this process is a composite part 26 that may have very complex shapes on the inside including a widely ramified pipe system and/or undercut portion.

In order to improve manufacturing a composite part 26 the invention proposes to 3D-print a mandrel 10 from a thermoplastic material that exhibits a glass transition. The mandrel 10 has a mandrel wall 12 made from the thermoplastic material and a cavity 14. The mandrel 10 is coated with an elastomer coat 16 and a fiber material 22 is arranged on the elastomer coat 16. A composite part 26 is formed from the fiber material 22 by inserting the mandrel 10 into a mold 24, pressurizing the mandrel 10, and heating the mold 24 to a mold temperature greater than the glass transition temperature without melting the mandrel wall. The mandrel 10 expands and presses the fiber material 22 against the mold 24. The composite part 26 is cured by increasing the mold temperature and simultaneously melting the mandrel wall 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 mandrel
12 mandrel wall
14 cavity
16 elastomer coat
18 outer mandrel surface
20 pulling device
21 thread
22 fiber material
24 mold
26 composite part

The invention claimed is:

1. A method for manufacturing a composite part, the method comprising:

a) preparing a mandrel from a thermoplastic material that exhibits a glass transition at a glass transition temperature, the mandrel having a mandrel wall that defines a cavity, applying a first fiber material to the mandrel wall, and dip-coating the mandrel wall with an elastomer coat so as to embed the first fiber material in the elastomer coat and form an outer surface of the mandrel wall;

b) arranging a second fiber material on the outer surface of the mandrel wall and inserting the mandrel into a mold;

c) forming a composite part from the second fiber material, wherein the forming includes pressurizing the cavity and heating the mandrel to a temperature greater than the glass transition temperature without melting the mandrel wall;

d) curing the composite part by heating the composite part to a curing temperature;

e) removing the mandrel by melting the mandrel wall to obtain a molten portion and removing the molten portion of the mandrel from the composite part.

2. The method according to claim 1, wherein the composite part is a part of an aircraft.

3. The method according to claim 1, wherein the mandrel is prepared by additive manufacturing.

4. The method according to claim 1, wherein in step a) the thermoplastic material is chosen to be soluble in a predetermined solvent.

5. The method according to claim 1, wherein step c) includes the mandrel wall expanding thereby pressing the elastomer coat towards the mold.

6. The method according to claim 1, wherein step e) includes removing the elastomer coat from the composite part.

7. The method according to claim 6, wherein the elastomer coat is removed from the composite part by pulling the elastomer coat, or using a vacuum, or both.

8. The method according to claim 1, wherein in step d) the elastomer coat is continuously pressed towards the mold.

9. The method according to claim 1, wherein in step b) the mold is a split-mold and the split-mold is closed after inserting the mandrel.

10. The method according to claim 1, wherein in step b) the mold is put in a vacuum bag.

11. The method according to claim 1, wherein in step b) the second fiber material is chosen from a group of fiber materials consisting of non-woven material, felt material, knitted material, woven material, and prepreg material.

12. The method according to claim 1, wherein in step c) the forming of the composite part comprises infusing the second fiber material with thermo-curable resin.

13. The method according to claim 1, wherein in step e) the removing of the molten portion of the mandrel includes pouring or washing with a solvent, or both.

14. A method for manufacturing a composite part, the method comprising:

a) preparing a mandrel from a thermoplastic material that exhibits a glass transition at a glass transition temperature, the mandrel having a mandrel wall that defines a cavity, and coating the mandrel wall with an elastomer coat and the elastomer coat forms an outer mandrel surface;

b) arranging a fiber material on the outer mandrel surface and inserting the mandrel into a mold;

c) forming a composite part from the fiber material, wherein the forming includes pressurizing the cavity and heating the mandrel to a temperature greater than the glass transition temperature without melting the mandrel wall;

d) curing the composite part by heating the composite part to a curing temperature; and e) removing the mandrel by melting the mandrel wall to obtain a molten portion and removing the molten portion of the mandrel from the composite part, wherein removing the mandrel includes removing the elastomer coat from the composite part by pulling the elastomer coat, or using a vacuum, or both.

* * * * *